United States Patent
Sung et al.

(10) Patent No.: US 7,227,106 B2
(45) Date of Patent: Jun. 5, 2007

(54) MODULAR GRILL COOKER AND MULTIPURPOSE COOKING APPARATUS HAVING THE SAME

(75) Inventors: Han Jun Sung, Suwon-si (KR); Yong Hyun Kwon, Suwon-si (KR); Chul Kim, Yongin (KR); Tae Uk Lee, Suwon-si (KR); Sung Ho Lee, Hwasung (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 278 days.

(21) Appl. No.: 10/824,480

(22) Filed: Apr. 15, 2004

(65) Prior Publication Data

US 2005/0051148 A1     Mar. 10, 2005

(30) Foreign Application Priority Data

Sep. 9, 2003    (KR) ...................... 10-2003-0063015

(51) Int. Cl.
*H05B 3/68* (2006.01)
(52) U.S. Cl. ............................... 219/452.11; 219/450.1
(58) Field of Classification Search ............ 219/443.1, 219/450.1, 451.1, 452.11, 452.12; 99/422, 99/425, 444, 445, 447
See application file for complete search history.

(56) References Cited

U.S. PATENT DOCUMENTS

| 2,542,442 A | * | 2/1951 | Weber ........................ 248/68.1 |
| 2,948,773 A | * | 8/1960 | Hawes .................... 174/153 R |
| 2,996,597 A | * | 8/1961 | Persinger et al. ........... 219/474 |
| 3,745,303 A | * | 7/1973 | Epperson et al. ........... 219/218 |
| 4,431,892 A | * | 2/1984 | White ........................ 219/623 |
| 4,632,089 A |   | 12/1986 | Wardell |
| 4,850,333 A | * | 7/1989 | Dellrud et al. ............ 126/25 A |
| 4,862,795 A |   | 9/1989 | Hawkins |

(Continued)

FOREIGN PATENT DOCUMENTS

GB     2 286 111     8/1995

(Continued)

OTHER PUBLICATIONS

Communication and European Search Report dated Feb. 8, 2005 in Patent Application No. 04252446.2 (3 pages).

(Continued)

*Primary Examiner*—S. Paik
(74) *Attorney, Agent, or Firm*—Staas & Halsey LLP

(57) ABSTRACT

A modular grill cooker that is easily installed in a multipurpose cooking apparatus, including an outer casing and an inner casing set in the outer casing. A heating unit is mounted to a heat reflecting plate fastened to the inner casing. A grilling unit is seated on a frame provided along upper edges of the inner and outer casings. An elastic piece is fitted over a projection on a back surface of the heating unit to mount the heating unit to the heat reflecting plate. A grease collecting unit is set in the inner casing to collect grease therein and reflect heat onto the grilling unit. First and second contact terminals are respectively provided on the outer casing and on the multipurpose cooking apparatus to supply electricity to the heating unit when the grill cooker is installed in the multipurpose cooking apparatus.

22 Claims, 8 Drawing Sheets

U.S. PATENT DOCUMENTS

| | | | |
|---|---|---|---|
| 5,176,067 A * | 1/1993 | Higgins | 99/340 |
| 5,189,945 A * | 3/1993 | Hennick | 99/339 |
| 5,546,851 A | 8/1996 | Goto | |
| 5,603,255 A * | 2/1997 | Nouvelot et al. | 99/400 |
| 6,082,249 A | 7/2000 | Su | |
| 6,399,925 B1 * | 6/2002 | Pickering et al. | 219/452.13 |
| 6,431,164 B1 * | 8/2002 | Wardell | 126/5 |

FOREIGN PATENT DOCUMENTS

| | | |
|---|---|---|
| JP | 11-193923 | 7/1999 |
| JP | 2000-217719 | 8/2000 |
| JP | 2002-199988 | 7/2002 |
| JP | 2003-130367 | 5/2003 |
| KR | 2000-59792 | 10/2000 |

OTHER PUBLICATIONS

Japanese Office Action in Japanese Patent Application No. 2004-137802 (3 pages).

European Examination Report dated Jun. 24, 2005 along with Attorney Response dated Sep. 14, 2005, and a clean and marked-up copy of Patent Application No. 04 252446.2.

* cited by examiner

MODULAR GRILL COOKER AND MULTIPURPOSE COOKING APPARATUS HAVING THE SAME

CROSS-REFERENCE TO RELATED APPLICATIONS

This application claims the benefit of Korean Patent Application No. 2003-63015, filed Sep. 9, 2003, in the Korean Intellectual Property Office, the disclosure of which is incorporated herein by reference.

BACKGROUND OF THE INVENTION

1. Field of the Invention

The present invention relates, in general, to a module-type grill cooker and a multipurpose cooking apparatus having the module-type grill cooker and, more particularly, to a module-type grill cooker that prevents smoke from being produced during cooking of food and that is easily assembled, and to a multipurpose cooking apparatus in which the module-type grill cooker is removably installed.

2. Description of the Related Art

Generally, meat, such as beef and pork, and processed meat, such as sausages, are best when cooked by a grilling, wherein heat is directly applied to the meat or processed meat placed on a grill. Thus, grilling is a popular way of cooking meat.

A conventional grill cooker to cook food by grilling includes a heating unit and a grilling unit. The heating unit is set in a cabinet of the grill cooker to directly apply heat to the food. The food is seated on the grilling unit to be cooked by the heating unit. Thus, heat generated from the heating unit is transmitted to the food placed on the grilling unit to cook the food.

When a user desires to grill meat, such as beef, pork and mutton, the meat is cut into small pieces. The meat pieces are seasoned with sauces of several different flavors. Thereafter, the seasoned meat pieces are placed on the grilling unit to be grilled. When the seasoned meat pieces are grilled, grease runs from the seasoned meat pieces. The grease is mixed with the sauces, and then is burned by heat transmitted from the heating unit to the grilling unit, resulting in partially scorching the meat pieces. Further, the meat pieces may stick to the grilling unit.

The scorched food is harmful to health. When the food sticks to the grilling unit, it is difficult to remove the food from the grilling unit. Thus, the grilling unit must be frequently replaced with a new grilling unit, causing inconvenience to a user. Further, it is very difficult to clean the grilling unit after use.

When the food, grease and sauces dripping from the food burn, smoke is produced. Thus, an exhaust device, such as an exhaust fan and an exhaust duct, is required to provide a pleasant cooking environment.

The grill cooker may be independently used to grill the food. Alternatively, the grill cooker may be installed in a multipurpose cooking apparatus, which have multiple cookers, to be used along with the other cookers.

However, a conventional grill cooker does not have a modular structure. Thus, to install the grill cooker in the multipurpose cooking apparatus, first, the cabinet of the grill cooker must be mounted to the multipurpose cooking apparatus. Next, a contact terminal of a heating unit must be connected to a corresponding contact terminal of the multipurpose cooking apparatus to mount the heating unit to the cabinet of the grill cooker.

Further, when it is required to remove the conventional grill cooker from the multipurpose cooking apparatus, first, the contact terminal of the heating unit is disconnected from the contact terminal of the multipurpose cooking apparatus to remove the heating unit from the cabinet of the grill cooker. Thereafter, the cabinet of the grill cooker is removed from the multipurpose cooking apparatus. Thus, it is complicated to install and remove the grill cooker in and from the multipurpose cooking apparatus.

The conventional grill cooker has another problem, as described above, in that smoke is produced during grilling of the food, thus an exhaust device to draw out the smoke is required in the multipurpose cooking apparatus in which the grill cooker is installed, resulting in complication in construction of the multipurpose cooking apparatus.

SUMMARY OF THE INVENTION

It is an aspect of the present invention to provide a modular grill cooker that prevents smoke from being produced during grilling of food and that is easily assembled.

It is another aspect of the present invention to provide a multipurpose cooking apparatus in which the module-type grill cooker is easily and removably installed.

Additional aspects and/or advantages of the invention will be set forth in part in the description which follows and, in part, will be obvious from the description, or may be learned by practice of the invention.

To achieve the above and/or other aspects of the present invention, there is provided a modular grill cooker, including an outer casing having an open top, an inner casing having an open top and a size less than that of the outer casing to set the inner casing in the outer casing, while defining a space between the inner casing and the outer casing, a heating unit mounted to a predetermined portion of the inner casing, and a grilling unit seated on the open top of the outer casing to grill food placed on the grilling unit.

The modular grill cooker may further include a frame placed along upper edges of the inner casing and the outer casing to prevent the inner casing from moving relative to the outer casing.

The frame may include an extension part inwardly extending from an outer edge of the frame, and a support step downwardly inclined from an inner edge of the extension part. The outer edge of the frame may be fastened to the outer casing and the upper edge of the inner casing may be supported by the support step to hold the inner casing in the outer casing.

The modular grill cooker may further include a heat reflecting plate on a side surface of the inner casing, which supports the heating unit on the inner casing.

A projection may be provided on a back surface of the heating unit that passes through a hole formed in the heat reflecting plate. At least one elastic piece may be fitted over the projection at a back surface of the heat reflecting plate to mount the heating unit to the heat reflecting plate.

A flange may be provided along an edge of the hole of the heat reflecting plate that forwardly projects from the heat reflecting plate to provide a space between the heating unit and the heat reflecting plate.

The heat reflecting plate may have locking holes on upper and lower portions of front and rear ends of the heat reflecting plate, and on upper and lower portions of front and rear surfaces of the inner casing, to lock the heat reflecting plate to the front and rear surfaces of the inner casing.

Any one of the locking holes provided on each of the front and rear surfaces of the inner casing may be formed in a horizontal direction to allow an angle of the heat reflecting plate relative to the inner casing to be adjusted.

The modular grill cooker may further include a grease collecting/heat reflecting unit installed in the inner casing to collect grease and sauces dripping from the food, and to reflect heat from the heating unit to the grilling unit.

The grease collecting/heat reflecting unit contains water therein to prevent the grease and the sauces collected in the grease collecting/heat reflecting unit from burning due to heat transmitted from the heating unit.

A handle may be provided on each of front and rear ends of the grease collecting/heat reflecting unit that moves in a vertical direction to allow the grease collecting/heat reflecting unit to be put into or removed from the inner casing.

The grilling unit includes a plurality of grilling pipes, and a frame mounted to the grilling pipes to communicate with the grilling pipes, with a water supply hole being formed on an upper portion of the frame to supply water into the grilling pipes.

The outer casing includes a contact terminal to supply external electricity to the heating unit.

To achieve the above and/or other aspects of the present invention, there is provided a multipurpose cooking apparatus, including a housing one or more recesses on an upper portion of the housing, and a modular grill cooker removably seated in one of the recesses. The modular grill cooker includes an outer casing having an open top, an inner casing having an open top and a size less than that of the outer casing to set the inner casing in the outer casing, while defining a space between the inner casing and the outer casing, at least one heat reflecting plate set in the inner casing, a heating unit mounted to a predetermined portion of the at least one heat reflecting plate, and a frame placed along upper edges of the inner casing and outer casing to prevent the inner casing from moving relative to the outer casing.

A first contact terminal may be provided on an outer surface of the outer casing, and a second contact terminal may be provided in the recess of the housing to correspond to the first contact terminal, thus supplying electricity to the heating unit when the modular grill cooker is seated in the recess, the first contact terminal contacting the second contact terminal.

The first contact terminal may be installed on one of a side surface, a front surface, a rear surface, and a bottom surface of the outer casing, and the second contact terminal may be installed in the recess at a position corresponding to the first contact terminal.

The first contact terminal may be a male terminal, and the second contact terminal may be a female terminal.

BRIEF DESCRIPTION OF THE DRAWINGS

These and/or other aspects and advantages of the invention will become apparent and more readily appreciated from the following description of the embodiment, taken in conjunction with the accompanying drawings of which.

DETAILED DESCRIPTION OF THE PREFERRED EMBODIMENT

Figure 1:
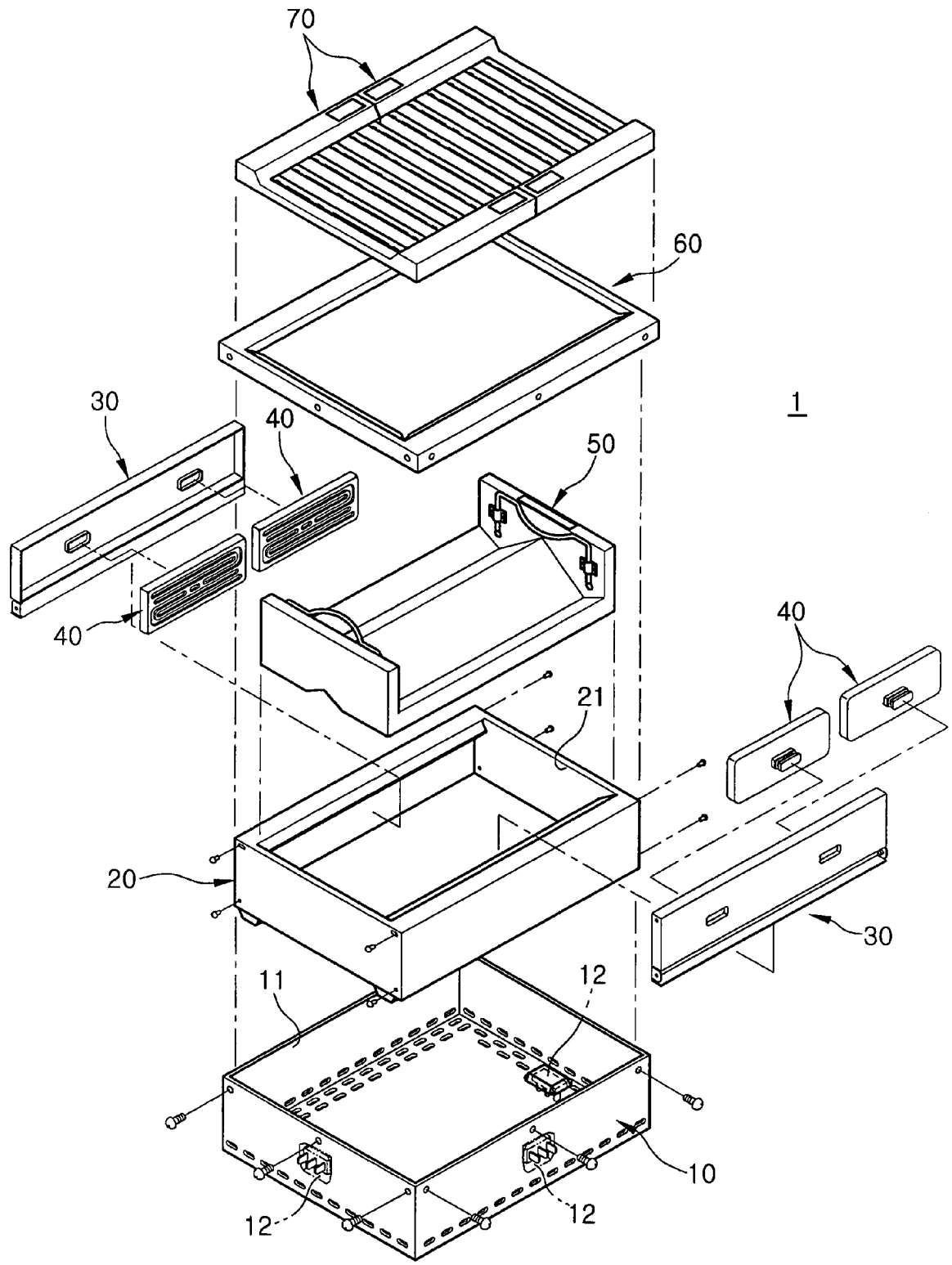
FIG. 1 is an exploded perspective view of a module-type grill cooker, according to an embodiment of the present invention, which includes heating units, heat reflecting plates, a grease collecting/heat reflecting unit, an inner casing, an outer casing, a frame, and grilling units.

Reference will now be made in detail to the embodiment of the present invention, examples of which are illustrated in the accompanying drawings, wherein like reference numerals refer to like elements throughout. The embodiment is described below to explain the present invention by referring to the figures.

FIG. 1 is an exploded perspective view of a module-type grill cooker 1, according to an embodiment of the present invention, which includes heating units 40, heat reflecting plates 30, a grease collecting/heat reflecting unit 50, an inner casing 20, an outer casing 10, a frame 60, and grilling units 70.

As shown in FIG. 1, the grill cooker 1 according to the present invention includes the box-shaped outer casing 10, which has an opening 11 at a top thereof. The inner casing 20 has an opening 21 at a top thereof, and has a box shape of a smaller size than that of the outer casing 10, which is set in the outer casing 10. Two heat reflecting plates 30 are respectively mounted to opposite side surfaces of the inner casing 20. A pair of heating units 40 are mounted to each of the heat reflecting plates 30. The grease collecting/heat reflecting unit 50 is set in the inner casing 20 between the two heat reflecting plates 30. The grease collecting/heat reflecting unit 50 will be hereinafter referred to as a grease collecting unit. The frame 60 is placed along upper edges of the inner casing 20 and the outer casing 10 to prevent the inner casing 20 from moving relative to the outer casing 10. Two grilling units 70 are seated on the frame 60 to grill food placed on the grilling units 70.

The grill cooker 1 of the present invention has a modular construction in which several components, including the inner casing 20 and the outer casing 10, the heat reflecting plates 30, the heating units 40, the grease collecting unit 50, the frame 60, and the grilling units 70, are assembled with each other into a single body. A first contact terminal 12 is provided on any one of a side surface, a front surface, a rear surface, and a bottom surface of the outer casing 10 of the grill cooker 1, and is connected to an electric power source to supply electricity to each of the heating units 40.

Each of the heating units 40 comprises an electric heater that is made of a ceramic material in which a heating wire is embedded. Thus, when electricity is supplied to the heating wire, heat is generated, and, simultaneously infrared rays are radiated from the ceramic material to cook the food. However, the heating units 40 may be constructed differently. For example, the heating units 40 may include a gas heater or a charcoal heater.

According to the embodiment of the present invention shown in FIG. 1, the grill cooker 1 has two grilling units 70. However, the grill cooker 1 may have more than one grilling unit. Further, according to the embodiment of the present invention shown in FIG. 1, a pair of the heating units 40 are mounted to each of the heat reflecting plates 30. However, a long heating unit or several short heating units may be mounted to each of the heat reflecting plates 30.

The assembling of the heat reflecting plates 30, the heating units 40, and the grease collecting unit 50 in the inner casing 20 will be described with reference to FIGS. 2 to 4.

Figure 2:
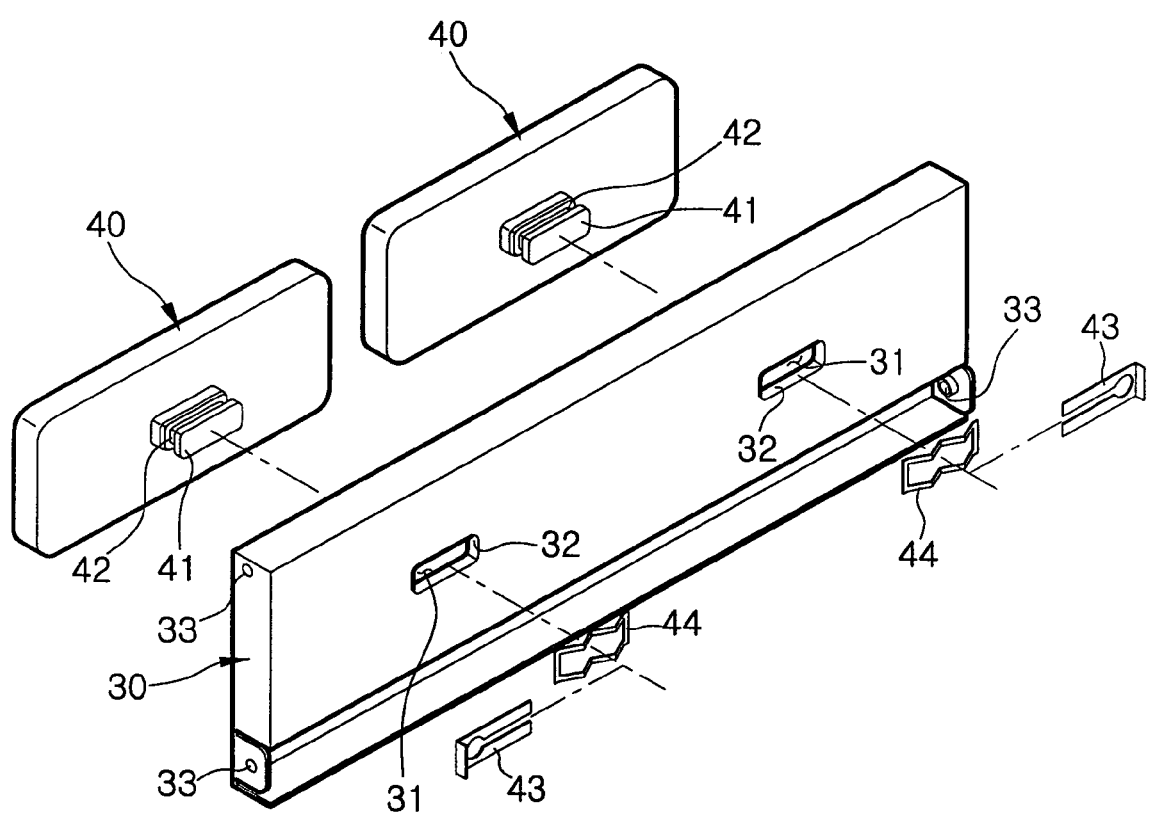
FIG. 2 is a perspective view of the heat reflecting plate with the heating units of FIG. 1.

As shown in FIG. 2, a projection 41 is provided on a back surface of each of the heating units 40 to mount the heating units 40 to the heat reflecting plates 30. A groove 42 is formed along a circumference of each of the projections 41 to allow first and second elastic pieces 43 and 44, which will be described later, to be fitted over the groove 42.

Each of the heat reflecting plates 30 is inwardly projected at an edge thereof to receive the two heating units 40. Two holes 31 are respectively formed on both sides of each of the heat reflecting plates 30 to allow the projections 41 of the heating units 40 to pass through the heat reflecting plates 30. Locking holes 33 are formed on upper and lower portions of front and rear ends of each of the heat reflecting plates 30 to lock the heat reflecting plates 30 to the inner casing 20.

A flange 32 is provided along an edge of each of the holes 31 to be inwardly projected from each of the heat reflecting plates 30. Thus, when the projections 41 of the heating units 40 are inserted into the corresponding holes 31 of the heat reflecting plates 30, the heating units 40 are spaced apart from the heat reflecting plates 30 by a predetermined interval, which reduces heat transferred from the heating units 40 to the heat reflecting plates 30. Further, such a construction allows heat radiated from the heating units 40 to surfaces of the heat reflecting plates 30 to be forwardly reflected from the heat reflecting plates 30 (see FIG. 7). Each of the flanges 32 has a width such that the groove 42 of each of the projections 41 is placed in back of each of the heat reflecting plates 30 after passing through the hole 31.

A slot, which has a smaller width than the groove 42, is longitudinally formed on each of the first elastic pieces 43. When each of the heating units 40 is mounted to a back surface of each of the heat reflecting plates 30, each of the first elastic pieces 43 is elastically opened to make the slot wider, thus engaging with the groove 42 of each of the projections 41.

Each of the second elastic pieces 44 is shaped as a waved rectangular ring, and is fitted over each of the projections 41 in front of each of the first elastic pieces 43, thus applying an elastic force to each of the heating units 40 to elastically support the heating units 40 relative to the heat reflecting plates 30.

Figure 3:
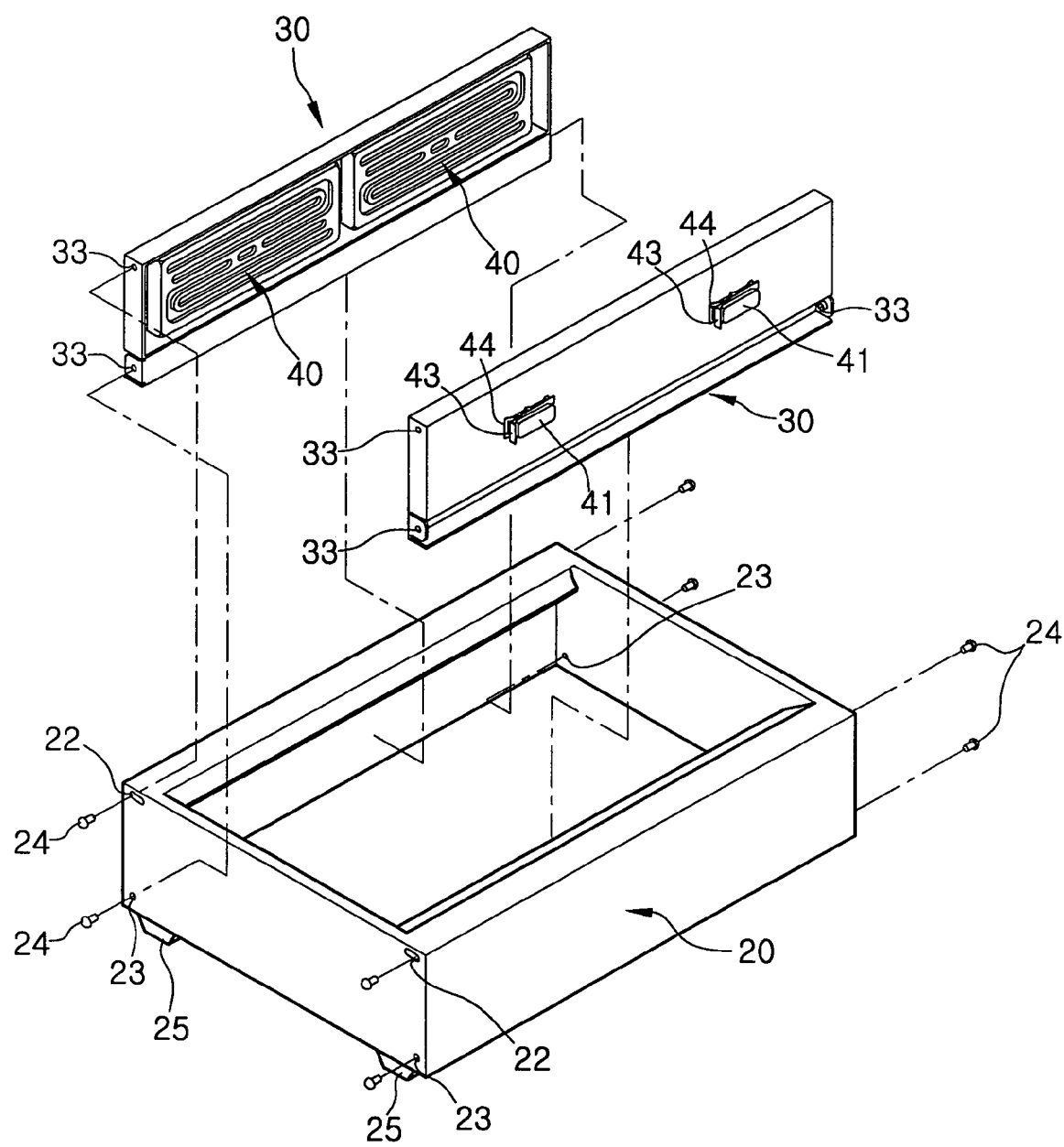
FIG. 3 is a perspective view of the inner casing with the heat reflecting plates of FIG. 2.

Thus, when the projection 41 of each of the heating units 40 passes through the corresponding hole 31 of each of the heat reflecting plates 30 and the first and second elastic pieces 43 and 44 are fitted over the groove 42 of the projection 41, as shown in FIG. 3, each of the heating units 40 is easily mounted to the heat reflecting plate 30.

The heat reflecting plates 30, each having a pair of heating units 40, are mounted to the opposite side surfaces of the inner casing 20. To mount the heat reflecting plates 30 to the inner casing 20, locking holes 22 and 23 are formed on upper and lower portions of front and rear surfaces of the inner casing 20.

Legs 25 are downwardly projected from both sides of a bottom of the inner casing 20. Thus, the legs 25 contact a bottom of the outer casing 10, so that the bottom of the inner casing 20 is spaced apart from the bottom of the outer casing 10 by a height of the legs 25.

The locking holes 22, which are provided at an upper portion of the inner casing 20, are formed in a horizontal direction, thus allowing the heat reflecting plates 30 to be arranged perpendicularly to the grilling units 70 or to be inclined relative to the grilling units 70 at a predetermined angle. Such locking holes 22 allow angles of the heating units 40, which are mounted to the heat reflecting plates 30, relative to the grilling units 70 to be adjusted (see FIG. 7).

Screws 24 are tightened into the locking holes 33 of the heat reflecting plates 30 after passing through the locking holes 22 and 23 of the inner casing 20, so that each of the heat reflecting plates 30 having a pair of heating units 40 is mounted to the side surface of the inner casing 20.

Figure 5:
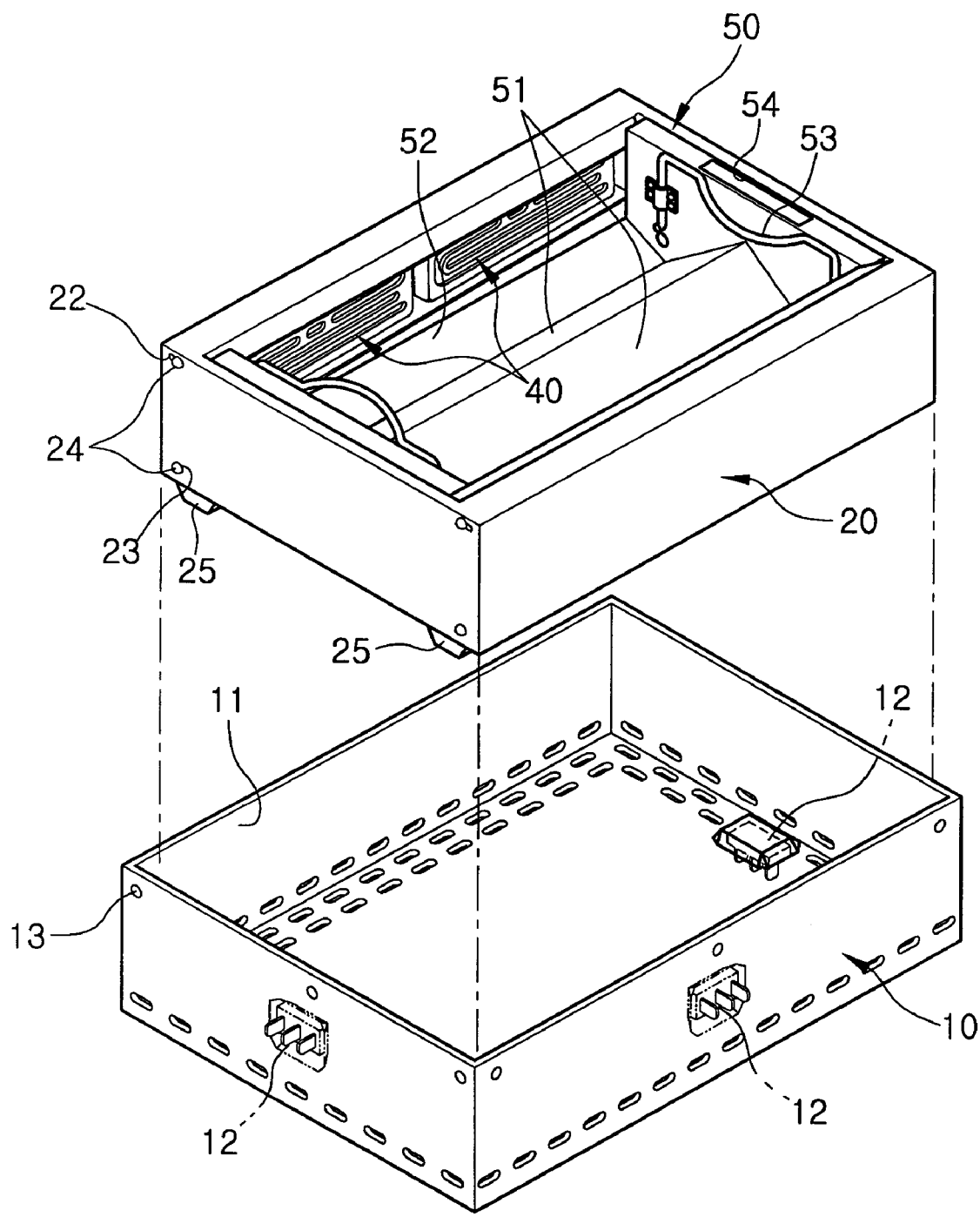
FIG. 5 is a perspective view of the outer casing in which the inner casing and the grease collecting/heat reflecting unit of FIG. 4 is installed.

After the heat reflecting plates 30 are mounted to the inner casing 20, the grease collecting unit 50 is set in the inner casing 20 through the opening 21 and placed between the heat reflecting plates 30 (see FIG. 5).

Figure 4:
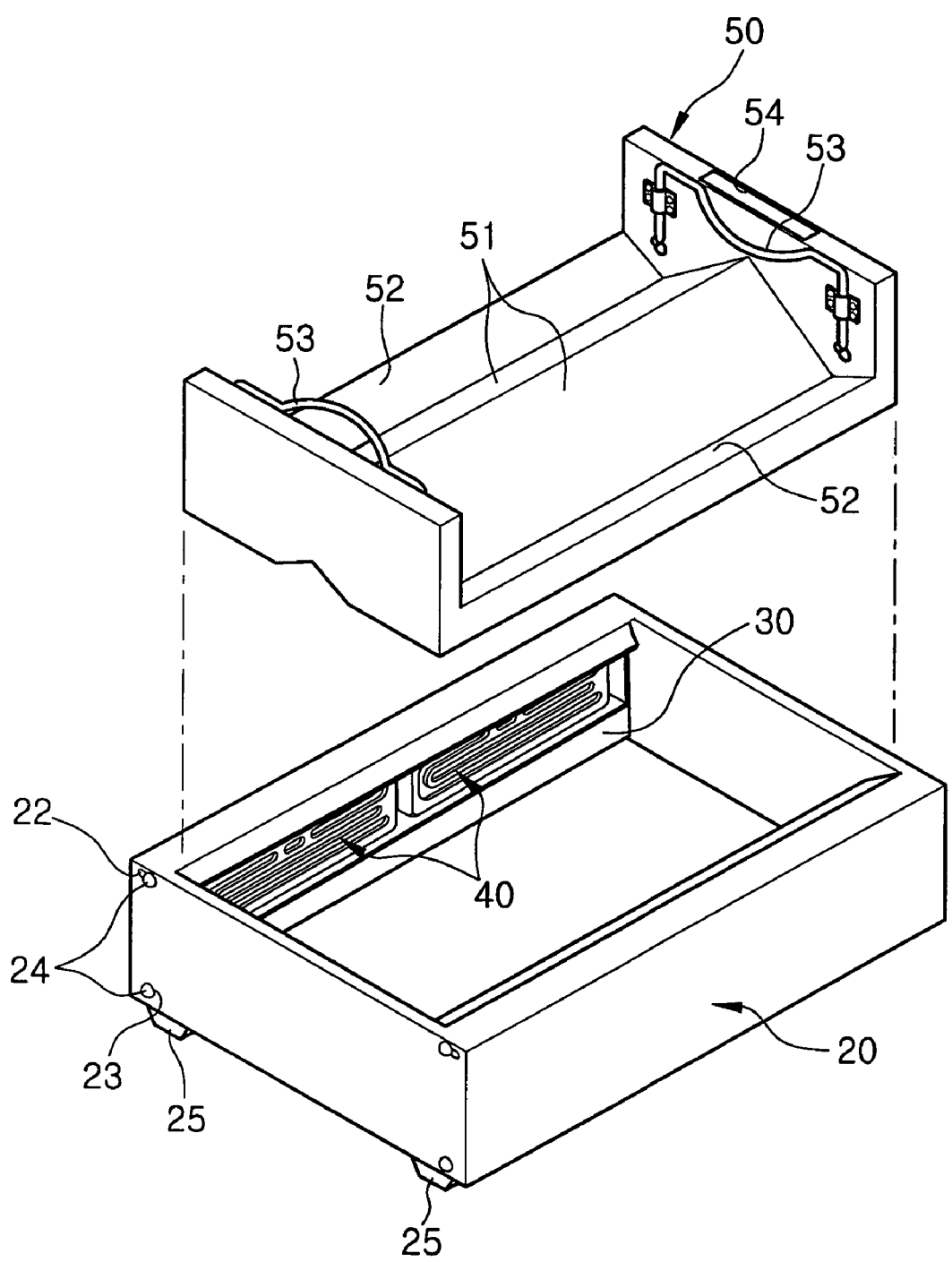
FIG. 4 is a perspective view of the grease collecting/heat reflecting unit that is set in the inner casing of FIG. 3.

As shown in FIG. 4, the grease collecting unit 50 has a W-shaped cross-section, and includes heat reflecting surfaces 51 and 52. The heat reflecting surfaces 51 and 52 face the heating units 40 to reflect heat on the grilling units 70. Thus, during grilling of the food, grease and sauces dripping from the food are collected in valleys that are defined along junctions between the heat reflecting surfaces 51 and 52.

Two handles 53 are provided on front and rear ends of the grease collecting unit 50 and are movable in a vertical direction, thus allowing the grease collecting unit 50 to be put into, or removed from, the inner casing 20 using the handles 53.

The grease collecting unit 50 contains water therein. A water supply hole 54 is provided on an upper portion of the grease collecting unit 50 to supply water to the grease collecting unit 50, thus preventing the grease and sauces dripping to the heat reflecting surfaces 51 and 52 from burning by heat generated by the heating units 40.

The grease collecting unit 50 may be set in the inner casing 20 before the inner casing 20 is assembled with the outer casing 10. Alternatively, the grease collecting unit 50 may be set in the inner casing 20 after the inner casing 20 is assembled with the outer casing 10.

The operation of assembling the inner casing 20 having the heating units 40, the heat reflecting plates 30, and the grease collecting unit 50, with the outer casing 10 and the frame 60 will be described with reference to FIGS. 5 to 7.

As shown in FIG. 5, when the inner casing 20 having the heating units 40, the heat reflecting plates 30, and the grease collecting unit 50 is set in the outer casing 10 through the opening 11 of the outer casing 10, the bottom of the inner casing 20 is spaced apart from the bottom of the outer casing 10 by the legs 25. Further, the inner casing 20 has a smaller size than the outer casing 10, so that a space 15 is defined between the outer casing 10 and the inner casing 20 (see FIG. 7).

After the inner casing 20 is set in the outer casing 10, while defining the space 15 between the inner casing 20 and the outer casing 10, the frame 60 is placed on upper portions of the inner casing 20 and the outer casing 10. Thereafter, screws 14 (FIG. 6) are tightened into locking holes 61 that are formed on a side surface of the frame 60 and locking holes 13 that are formed on an outer surface of the outer casing 10, to lock the frame 60 to the outer casing 10.

Figure 6:
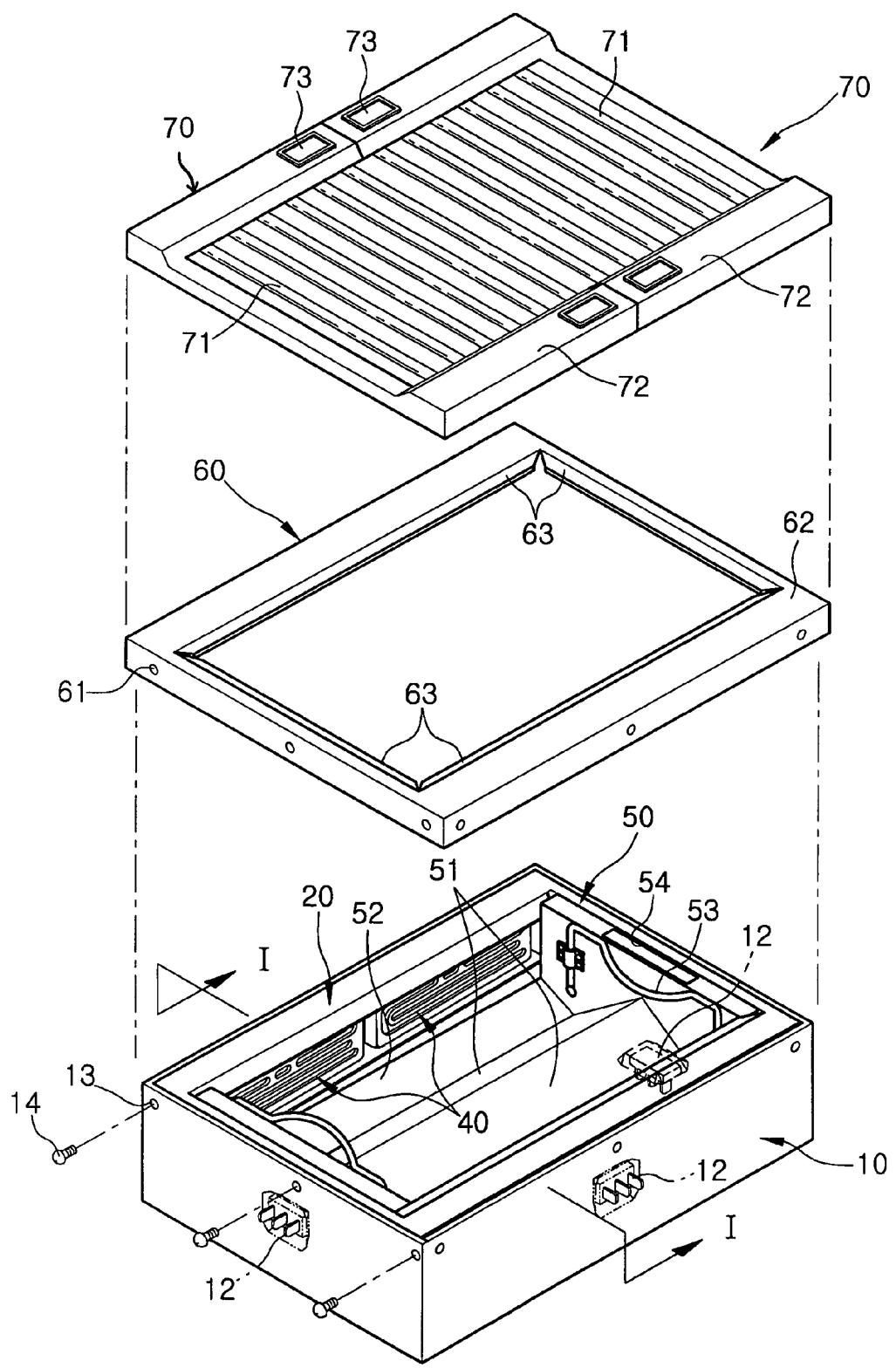
FIG. 6 is a perspective view of the frame with the outer casing of FIG. 5, in which the grilling units are placed on the frame.

As shown in FIG. 6, the frame 60 includes an extension part 62 and a support step 63. The extension part 62 inwardly extends from an upper edge of the side surface of the frame 60. The support step 63 is downwardly inclined from an inner edge of the extension part 62, at a predetermined angle.

Figure 7:
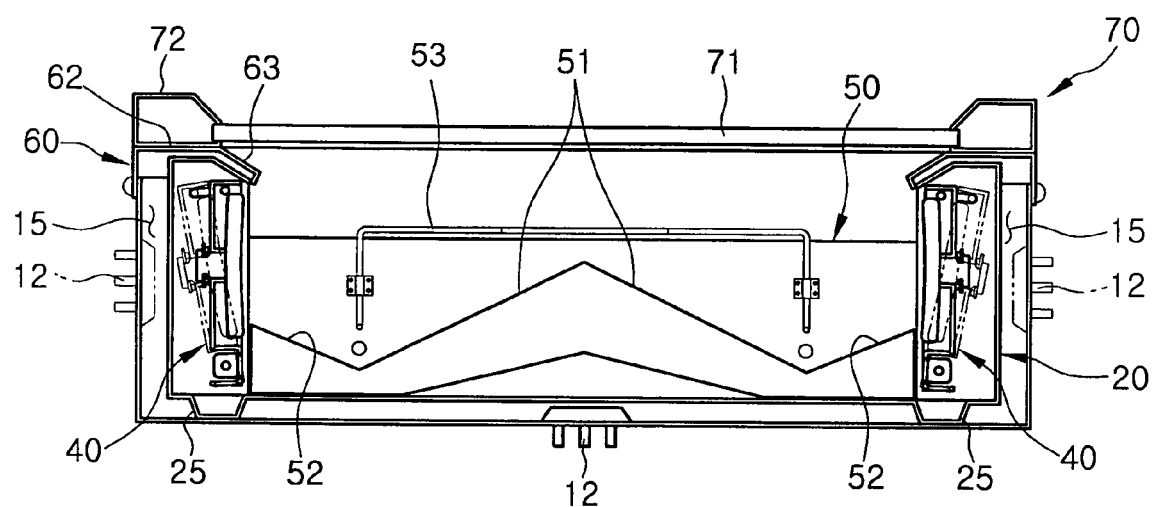
FIG. 7 is a sectional view of the modular grill cooker taken along a line I—I of FIG. 6.

Thus, as shown in FIG. 7, after the frame 60 is screwed to the outer casing 10, an upper edge of the inner casing 20 is supported by the support step 63, thus allowing the inner casing 20 to be set in the outer casing 10 without moving relative to the outer casing 10. To firmly install the inner casing 20 in the outer casing 10, the legs 25 of the inner casing 20, which contact the outer casing 10, may be screwed to the outer casing 10.

A wire distributing operation is carried out, prior to installing the inner casing 20 in the outer casing 10. Through the wire distributing operation, wires (not shown), which are connected to the heating units 40 to supply electricity to the heating units 40, are connected to the first contact terminal 12 that is provided on any one of the outer surfaces of the outer casing 10.

As shown in FIG. 7, the wires that connect the heating units 40 to the first contact terminal 12 are placed in the space 15 defined between the inner casing 20 and the outer casing 10. The space 15 also serves as a heat insulating space to prevent heat generated from the heating units 40 from being transmitted through the inner casing 20 to the outer casing 10.

After the frame 60 is assembled with the outer casing 10 so that the inner casing 20 is held in the outer casing 10, the grilling units 70 are placed on the extension part 62 of the frame 60, completing the assembly of the grill cooker 1 to grill food.

According to the embodiment of the present invention, the grill cooker 1 has two grilling units 70, so that one of the grilling units 70 is placed on the heating units 40 that are in a front portion of the inner casing 20 while the other grilling unit 70 is placed on the heating units 40 that are in a rear portion of the inner casing 20. However, the grill cooker 1 may have one long grilling unit.

As shown in FIG. 6, each of the grilling units 70 has a plurality of grilling pipes 71 that are spaced apart from each other by a predetermined interval. A frame 72 is mounted to the grilling pipes 71 of each of the grilling units 70 to communicate with each of the grilling pipes 71 and to contain water therein. Water supply holes 73 are formed on both sides of an upper portion of each of the frames 72 to supply water into each of the frames 72.

Thus, when water is supplied into each of the frames 72 through the water supply holes 73, the water is fed into the grilling pipes 71 of each of the grilling units 70. Thus, although heat is transmitted from the heating units 40 to the grilling units 70, the grilling pipes 71 and the frames 72 are not heated above a predetermined temperature.

While the food is grilled using the grilling units 70 constructed as described above, the food placed on the grilling pipes 71 does not stick to the grilling pipes 71. Thus, the food is easily removed from the grilling pipes 71. Further, residues do not stick to the grilling pipes 71, making it easy to clean the grilling units 70 after the food is grilled.

The installation of the grill cooker 1 in a multipurpose cooking apparatus 100 according to the embodiment of the present invention will be described with reference to FIG. 8.

Figure 8:
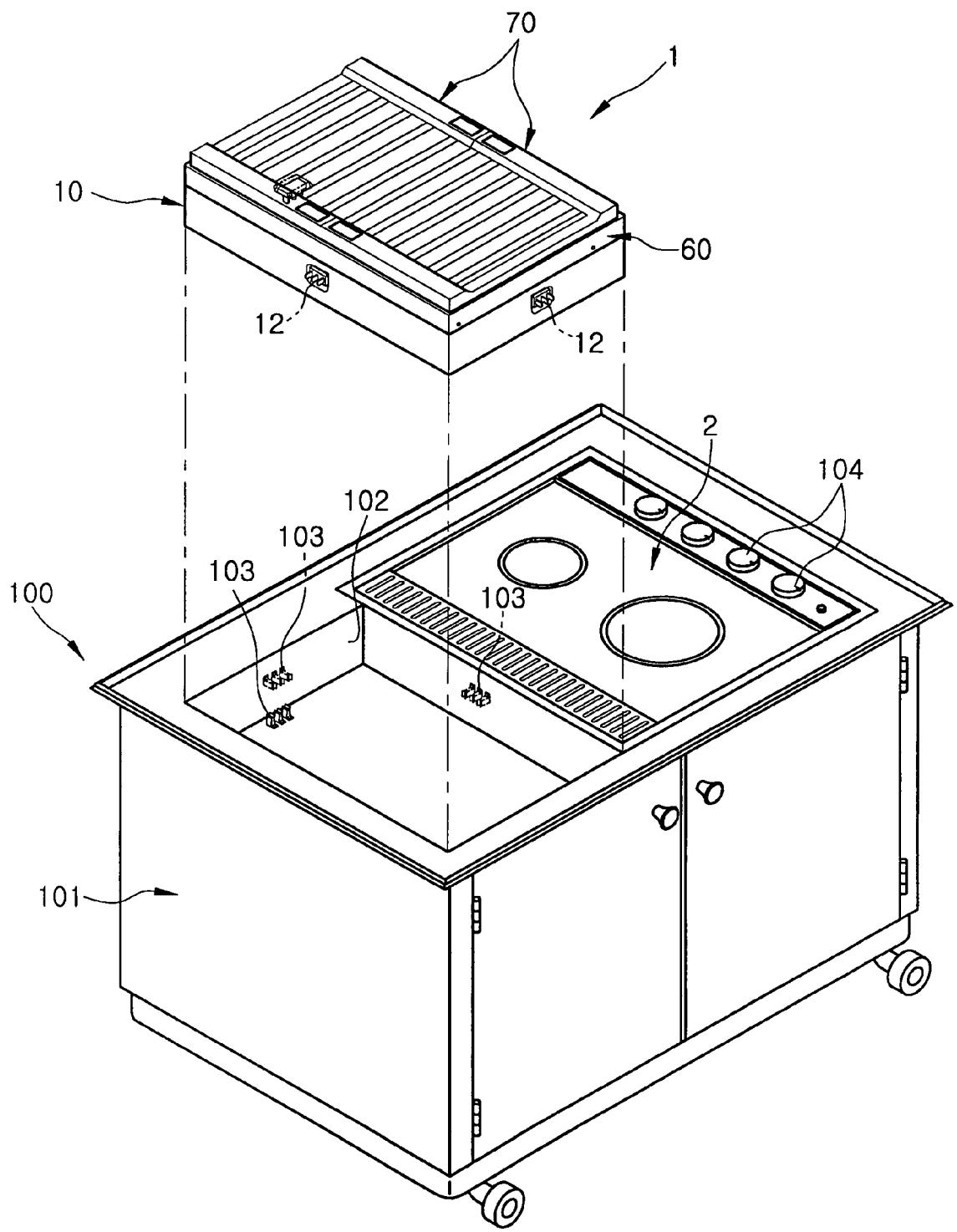
FIG. 8 is a perspective view of a multipurpose cooking apparatus in which the module-type grill cooker of FIG. 7 is installed.

As shown in FIG. 8, the multipurpose cooking apparatus 100 includes a housing 101, which defines an external appearance of the multipurpose cooking apparatus 100. The housing 101 has a recess 102 at an upper portion thereof to receive the grill cooker 1, as well as a different kind of cooker 2, for example, an induction cooker.

The recess 102 is slightly larger than the grill cooker 1 to receive the grill cooker 1 therein. A second contact terminal 103 is provided in the recess 102 at a position corresponding to the first contact terminal 12, which is provided on the outer casing 10 of the grill cooker 1. The second contact terminal 103 is connected to the first contact terminal 12 to supply electricity to the heating units 40.

In other words, when the first contact terminal 12 is provided on the bottom of the outer casing 10, the second contact terminal 103 is provided on a bottom of the recess 102. Further, when the first contact terminal 12 is provided on a side or rear surface of the outer casing 10, the second contact terminal 103 is provided on a side or rear surface of the recess 102 to correspond to the position of the first contact terminal 12.

The first contact terminal 12 is a male contact terminal, while the second contact terminal 103 is a female contact terminal. Thus, the first contact terminal 12 is electrically connected to the second contact terminal 103, when the grill cooker 1 is installed in the recess 102 of the multipurpose cooking apparatus 100. Alternatively, the first contact terminal 12 may be the female contact terminal, and the second contact terminal 103 may be the male contact terminal.

Thus, when the grill cooker 1 is inserted into the recess 102, the first contact terminal 12 is electrically connected to the second contact terminal 103, thus allowing external electricity to be easily supplied to the heating units 40.

Further, a pair of power switches 104 are provided on an upper surface of the housing 101 to supply electricity to front and rear heating units 40, respectively, and to regulate heating temperatures of the front and rear heating units 40, respectively.

After the grill cooker 1 is inserted into the recess 102 so that the first contact terminal 12 and the second contact terminal 103 are electrically connected to each other and the power switches 104 are turned on to supply electricity to the heating units 40, the food is placed on the grilling units 70. Heat is directly transmitted from the heating units 40 to the grilling units 70, or is reflected by the heat reflecting plates 30 and the heat reflecting surfaces 51 and 52 of the grease collecting unit 50 and transmitted to the grilling units 70, thus grilling the food placed on the grilling units 70. Meanwhile, grease and sauces dripping from the food are collected in the grease collecting unit 50.

During grilling of the food, the grilling pipes 71 and the frame 72 of each of the grilling units 70 are not heated above a predetermined temperature, thus preventing the food from burning and sticking to the grilling pipes 71 and the frame 72. Further, the grease collecting unit 50 contains water therein, thus preventing grease and sauces dripping to the heat reflecting surfaces 51 and 52 from burning.

Thus, because smoke is rarely produced while the food is grilled using the grill cooker 1 according to the embodiment of the present invention, the food is cooked in a pleasant environment. Further, an exhaust device to draw out smoke is not needed.

After the food is grilled using the grill cooker 1, the grilling units 70 are removed from the frame 60, and the grease collecting unit 50 is removed from the inner casing 20 to be cleaned. Further, when a user holds and lifts the support step 63 of the frame 60, the grill cooker 1 may be removed from the recess 102 of the multipurpose cooking apparatus 100, regardless of whether the grease collecting unit 50 has been removed from the inner casing 20.

As is apparent from the above description, the present invention provides a grill cooker with a modular construction that is easily assembled, and easily installed in and removed from a multipurpose cooking apparatus.

Further, according to the present invention, the grill cooker has a first contact terminal on an outer surface of an outer casing of the grill cooker, and the multipurpose cooking apparatus has a second contact terminal in a recess of the multipurpose cooking apparatus, so that the first and second contact terminals are electrically connected to each other when the grill cooker is installed in the recess of the multipurpose cooking apparatus. The grill cooker is easily and reliably installed in the multipurpose cooking apparatus, without any misalignment of the first contact terminal with the second contact terminal.

In addition, the present invention provides a grill cooker that prevents grease and sauces dripping from the food from burning, thus allowing the food to be cooked in a pleasant environment. Further, an exhaust device to draw out smoke is not needed.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A modular grill cooker, comprising:
   an outer casing having an open top;
   an inner casing having an open top, and having a size less than that of the outer casing to set the inner casing in the outer casing, while defining a space between the inner casing and the outer casing;
   a heating unit mounted to a predetermined portion of the inner casing;
   a grilling unit seated on the open top of the outer casing to grill food placed on the grilling unit; and
   a frame placed along upper edges of the inner casing and the outer casing to prevent the inner casing from moving relative to the outer casing, wherein the frame comprises:
      an extension part inwardly extending from an outer edge of the frame, and
      a support step downwardly inclined from an inner edge of the extension part, the outer edge of the frame being fastened to the outer casing and the upper edge of the inner casing being supported by the support step to hold the inner casing in the outer casing.

2. The modular grill cooker according to claim 1, further comprising:
   a heat reflecting plate provided on a side surface of the inner casing, and supporting the heating unit on the inner casing.

3. The modular grill cooker according to claim 2, further comprising:
   a projection provided on a back surface of the heating unit that passes through a hole formed in the heat reflecting plate; and
   at least one elastic piece fitted over the projection at a back surface of the heat reflecting plate to mount the heating unit to the heat reflecting plate.

4. The modular grill cooker according to claim 1, further comprising:
   a grease collecting/heat reflecting unit installed in the inner casing to collect grease and sauces dripping from the food, and to reflect heat from the heating unit to the grilling unit.

5. The modular grill cooker according to claim 4, wherein the grease collecting/heat reflecting unit contains water therein to prevent the grease and the sauces collected in the grease collecting/heat reflecting unit from burning due to heat transmitted from the heating unit.

6. The modular grill cooker according to claim 4, further comprising:
   a handle provided on each of front and rear ends of the grease collecting/heat reflecting unit that moves in a vertical direction to allow the grease collecting/heat reflecting unit to be put into or removed from the inner casing.

7. The modular grill cooker according to claim 1, wherein the grilling unit comprises:
   a plurality of grilling pipes; and
   a frame mounted to the grilling pipes to communicate with the grilling pipes, with a water supply hole being formed on an upper portion of the frame to supply water into the grilling pipes.

8. The modular grill cooker according to claim 1, wherein the outer casing has a contact terminal to supply external electricity to the heating unit.

9. The modular grill cooker according to claim 8, wherein wires that connect the heating unit to the contact terminal are placed in the space defined between the inner casing and the outer casing, the space preventing heat generated from the heating unit from being transmitted through the inner casing to the outer casing.

10. The modular grill cooker according to claim 1, further comprising legs downwardly projected from both sides of a bottom of the inner casing and contacting a bottom of the outer casing to provide a space between the bottom of the inner casing and the bottom of the outer casing.

11. The modular grill cooker according to claim 1, wherein a point of contact between the frame and the outer casing is between the frame and a bottom of the modular grill cooker.

12. A modular grill cooker, comprising:
   an outer casing having an open top;
   an inner casing having an open top, and having a size less than that of the outer casing to set the inner casing in the outer casing, while defining a space between the inner casing and the outer casing;
   a heating unit mounted to a predetermined portion of the inner casing;
   a grilling unit seated on the open top of the outer casing to grill food placed on the grilling unit;
   a heat reflecting plate provided on a side surface of the inner casing, and supporting the heating unit on the inner casing;
   a projection provided on a back surface of the heating unit that passes through a hole formed in the heat reflecting plate;
   at least one elastic piece fitted over the projection at a back surface of the heat reflecting plate to mount the heating unit to the heat reflecting plate; and
   a flange provided along an edge of the hole of the heat reflecting plate that forwardly projects from the heat reflecting plate to provide a space between the heating unit and the heat reflecting plate.

13. The modular grill cooker according to claim 12, further comprising:
   a groove formed along a circumference of the projection, the at least one elastic piece being fitted over the groove of the projection.

14. The modular grill cooker according to claim 13, wherein the at least one elastic piece comprises a first elastic piece and a second elastic piece, the first elastic piece having a horizontal slot with a width less than a width of the groove, the first elastic piece being elastically opened to make the slot wider to engage the groove, and the second elastic piece having a shape of a waved rectangular ring that is fitted over the projection in front of the first elastic piece to elastically support the heating unit relative to the heat reflecting plate.

15. A modular grill cooker, comprising:
an outer casing having an open top;
an inner casing having an open top, and having a size less than that of the outer casing to set the inner casing in the outer casing, while defining a space between the inner casing and the outer casing;
a heating unit mounted to a predetermined portion of the inner casing;
a grilling unit seated on the open top of the outer casing to grill food placed on the grilling unit;
a frame placed along upper edges of the inner casing and the outer casing to prevent the inner casing from moving relative to the outer casing;
a heat reflecting plate provided on a side surface of the inner casing, and supporting the heating unit on the inner casing; and
locking holes on upper and lower portions of front and rear ends of the heat reflecting plate, and on upper and lower portions of front and rear surfaces of the inner casing, to lock the heat reflecting plate to the front and rear surfaces of the inner casing.

16. The modular grill cooker according to claim 15, wherein any one of the locking holes provided on each of the front and rear surfaces of the inner casing is formed in a horizontal direction to allow an angle of the heat reflecting plate relative to the inner casing to be adjusted.

17. A multipurpose cooking apparatus, comprising:
a housing having one or more recesses on an upper portion of the housing; and
a modular grill cooker removably seated in one of the recesses, the modular grill cooker comprising:
an outer casing having an open top;
an inner casing having an open top, and having a size less than that of the outer casing to the inner casing set in the outer casing, while defining a space between the inner casing and the outer casing;
at least one heat reflecting plate set in the inner casing;
a heating unit mounted to a predetermined portion of the at least one heat reflecting plate; and
a frame placed along upper edges of the inner casing and the outer casing to prevent the inner casing from moving relative to the outer casing, wherein the frame comprises:
an extension part inwardly extending from an outer edge of the frame, and
a support step downwardly inclined from an inner edge of the extension part, the outer edge of the frame being fastened to the outer casing and the upper edge of the inner casing being supported by the support step to hold the inner casing in the outer casing.

18. The multipurpose cooking apparatus according to claim 17, further comprising:
a first contact terminal provided on an outer surface of the outer casing; and
a second contact terminal provided in the recess of the housing and corresponding to the first contact terminal to supply electricity to the heating unit when the modular grill cooker is seated in the recess, the first contact terminal contacting the second contact terminal.

19. The multipurpose cooking apparatus according to claim 18, wherein the first contact terminal is installed on one of a side surface, a front surface, a rear surface, and a bottom surface of the outer casing, and the second contact terminal is installed in the recess at a position corresponding to the first contact terminal.

20. The multipurpose cooking apparatus according to claim 19, wherein the first contact terminal is a male terminal, and the second contact terminal is a female terminal.

21. The multipurpose cooking apparatus according to claim 17, further comprising:
a grilling unit seated on the frame to grill food placed on the grilling unit.

22. The multipurpose cooking apparatus according to claim 21, further comprising:
a grease collecting/heat reflecting unit installed in the inner casing to collect grease and sauces dripping from the food, and to reflect heat from the heating unit to the grilling unit.

* * * * *